United States Patent [19]

Wallischeck

[11] 4,211,151
[45] Jul. 8, 1980

[54] JAM PROOF PISTON

[75] Inventor: Karl H. Wallischeck, Fairfield, Conn.

[73] Assignee: United Technologies Corporation, Hartford, Conn.

[21] Appl. No.: 960,521

[22] Filed: Nov. 14, 1978

Related U.S. Application Data

[63] Continuation of Ser. No. 800,766, May 26, 1977, abandoned.

[51] Int. Cl.² .............................................. F01B 1/00
[52] U.S. Cl. ...................................... 92/146; 91/510; 92/165 R; 92/168
[58] Field of Search ............... 91/391 R, 510; 92/146, 92/150, 151, 165 R, 168, 170, 222, 248; 403/265, 359, 404; 137/797; 308/4 R

[56] References Cited

U.S. PATENT DOCUMENTS

| Re. 14,597 | 2/1919 | Jefferies | 138/140 |
|---|---|---|---|
| 3,040,712 | 6/1962 | Harrah | 92/248 |
| 3,330,217 | 7/1967 | Baur | 92/168 |
| 3,695,149 | 10/1972 | Eberhart | 92/168 |
| 3,884,127 | 5/1975 | Simmons | 92/151 |
| 4,029,000 | 6/1977 | Nakamura | 92/248 |

Primary Examiner—Abraham Hershkovitz
Attorney, Agent, or Firm—Vernon F. Hauschild

[57] ABSTRACT

An improved jam-proof control including a cylinder-piston assembly in which the piston is controllably positioned within the cylinder to perform the control function and in which the piston rod which extends through the cylinder wall is enveloped by a deformable sleeve so that when the piston rod is deformed by sharp impact, the piston rod is permitted to continue to reciprocate within the housing due to the deformation, either due to frangibility or softness, of the piston rod sleeve.

7 Claims, 3 Drawing Figures

JAM PROOF PISTON

The invention herein described was made in the course of or under a contract or subcontract thereunder, with the Department of the Army.

This is a continuation of application Ser. No. 800,766, filed May 26, 1977, and now abandoned.

BACKGROUND OF THE INVENTION

1. Field of Invention

This invention relates to control mechanisms and particularly to those which perform the control function by selectively positioning a piston within a cylinder and with the piston rod extending through the cylinder wall so that its free end produces the control motion. Such controls are conventionally used on aircraft and other vehicles in which jamming of the piston or piston rod within the cylinder produces control malfunction. One possible cause of piston or piston rod jamming within a cylinder is the striking of the control by a projectile in flight wherein the ballistic damage caused by such a projectile in passing through the control cylinder may displace the cylinder material so as to impede piston motion or cause piston jamming, and may also pass through the piston rod so that the displaced piston rod material cannot pass through the aperture provided in the cylinder for that purpose, thereby also either eliminating piston motion or causing piston rod and hence piston jamming.

2. Description of the Prior Art

In the flight control art, attempts have been made in the past to reduce or eliminate the ballistic vulnerability of a flight control by fabricating the cylinder and/or piston as armor utilizing conventional armor-plate techniques. Such armor construction is shown in Sliney U.S. Pat. No. 3,566,741 which teaches tubular armor plate formed from an impact-resistant outer armor shell and a slightly softer inner armor shell. Such constructions proved to be unreasonably heavy and large, and therefore, unacceptable for aircraft use and, further, they proved not to provide the desired ballistic-proof result.

Simmons U.S. Pat. No. 3,884,127 teaches such a control in which both the piston and the cylinder gland through which the piston rod extends are fabricated so as to be shearable so as to prevent piston or piston rod jamming. The Simmons patent has the disadvantage, however, that such flight controls are required to be tested to demonstrate that their structural integrity is such that they can withstand without rupture or permanent deformation 2.5 times the normal operating pressure which causes the piston to reciprocate within the cylinder. This test requirement dictates that the area of the piston must be at least 2½ times the area of the cylinder gland to be able to demonstrate such structural integrity and still result in a cylinder gland which is shearable under normal operating conditions. This requirement that the piston area be at least 2½ times the gland area results in a control of larger envelope and a greater weight that would otherwise be necessary. This envelope and weight problem is added to by the fact that larger hydraulic chambers formed by such a piston require the use of more operating fluid, with the attendant requirement for a larger fluid supply and dispensing system. In addition, such a large piston generates larger-than-normal operating forces which must be reacted by the remainder of the control system so that the remainder of the control system must be correspondingly strengthened, further increasing the weight problem.

SUMMARY OF THE INVENTION

A primary object of the present invention is to provide a control, including a cylinder/piston assembly, which is capable of withstanding the required structural integrity testing, which is of minimum weight and size, and which is capable of operation without piston or piston rod jamming when the piston rod is deformed for any reason, particularly by a ballistic impact.

According to the present invention, the cylinder is fabricated so as to be able to withstand the required test loading at desired cylinder size and the piston rod is fabricated so as to be enveloped by a deformable sleeve which snugly envelops the piston rod and which passes through and is able to reciprocate within the housing aperture conventionally provided for that purpose while maintaining sealing integrity.

In accordance with a further aspect of the present invention, the piston rod enveloping sleeve is fabricated to either be frangible so that it disintegrates upon ballistic impact or to be of a soft material which, once deformed by ballistic impact, will be further deformed in passing through the cylinder aperture so as to permit continued motion of the piston rod and piston within the cylinder, thereby permitting continued control function.

It is an important feature of this invention that the wall thickness of the sleeve enveloping the piston rod be sufficient that anticipated piston rod deformation due to ballistic hit will not extend radially outwardly therebeyond, and therefore the deformed piston rod will be able to continue to reciprocate through the cylinder aperture.

It is an important feature of this invention that the frangible sleeve is not a structural member and that the piston rod carries all loading and provides interior support for the frangible sleeve.

It is still a further object of this invention to teach such a construction in which the piston rod enveloping sleeve is loaded solely in compression and has the required flexibility to permit the required thermal expansion and the anticipated load deformation of the piston rod.

Other objects and advantages of the present invention may be seen by referring to the following description and claims, read in conjunction with the accompanying drawings.

DESCRIPTION OF THE PREFERRED EMBODIMENT

Figure 1:
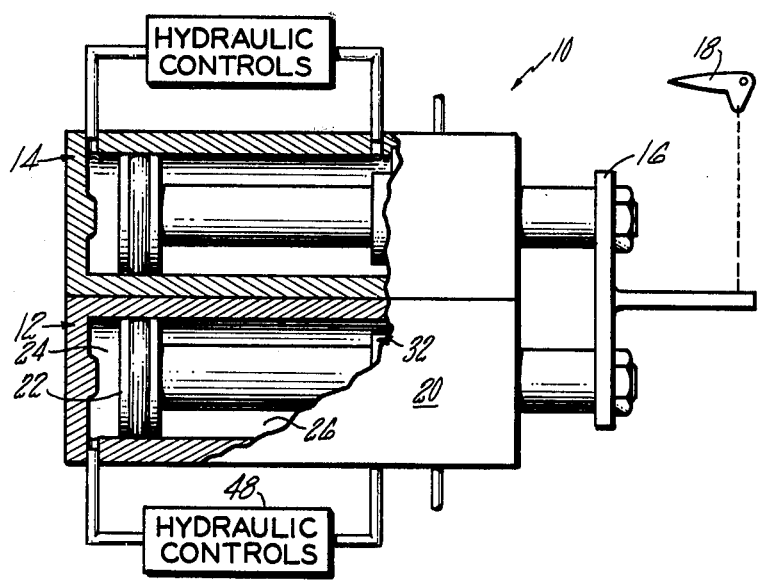
FIG. 1 is a cross-sectional showing of a control system of the flight variety utilizing my invention.

Referring to FIG. 1 we see a typical control 10 of the flight variety which includes two cylinder-piston assemblies 12 and 14 operating in parallel, so as to provide system redundancy, and which coact to position a control element 16, which is operably connected to and controls the position of the mechanism under control, such as flight surface 18. Cylinder-piston assemblies 12 and 14 are preferably identical in construction and operation so that cylinder-piston assembly 12 only will be described. Assembly 12 includes cylinder or cylindrical housing 20, which in conventional fashion envelops piston 22 so as to cooperate therewith in forming pressure chambers 24 and 26 on opposite sides thereof.

Figure 2:
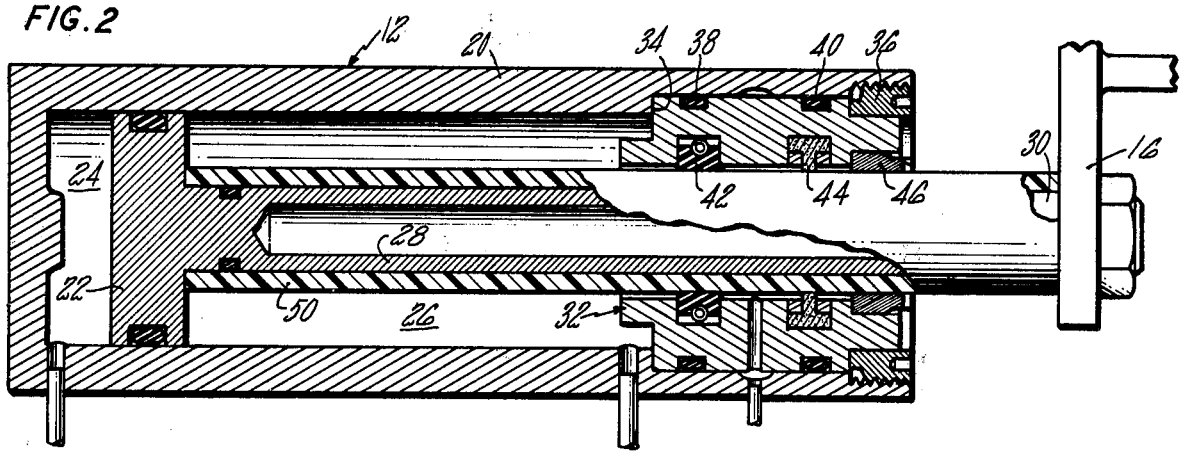
FIG. 2 is an enlarged and partial showing of such a control system to better illustrate the construction of the piston rod and the manner in which it extends through the cylinder housing aperture.

In conventional fashion, piston rod 28, which may be solid or hollow, extends from piston 22 to a station external of cylinder 20 so that its free end 30 engages control member 16. Gland ring 32 constitutes the cylinder wall which envelops piston rod 28. As best shown in FIG. 2, gland ring 32 is structurally supported from cylinder 20 in that ring 32 abuts cylinder stop 34 and is held thereagainst by retainer ring 36, which threadably engages housing 20. O-rings 38 and 40 serve as a seal between the outer periphery of ring 32 and housing 20 and conventional dynamic rod seals 42 and 44 seal between the inner periphery of gland ring 32 and piston rod 28. Wiper ring 46 is connected to gland 32 and serves its conventional anti-contaminant function.

Hydraulic controls 48, which are under pilot control, serve to control the pressure in chambers 24 and 26 and hence the preciprocating motion of piston 22 and piston rod 28 within cylinder 20.

It will be evident to those skilled in the art that while control 10 is shown to be hydraulically operated, it could as well be pneumatically operated, and that cylinder-piston assemblies 12 and 14 could as well operate in a conventional series relationship rather than the illustrated parallel relationship. A single cylinder arrangement could be used with appropriate pilot manual interconnect so that the pilot can manually provide the force required to actuate the piston following ballistic hit.

It will be evident by viewing FIG. 1 that as piston 22 is caused to reciprocate within cylinder 20, piston rod 28 reciprocates therewith so that its free end 30 causes control member 16 to position control surface 18 in accordance with the dictates of control 10.

Figure 3:
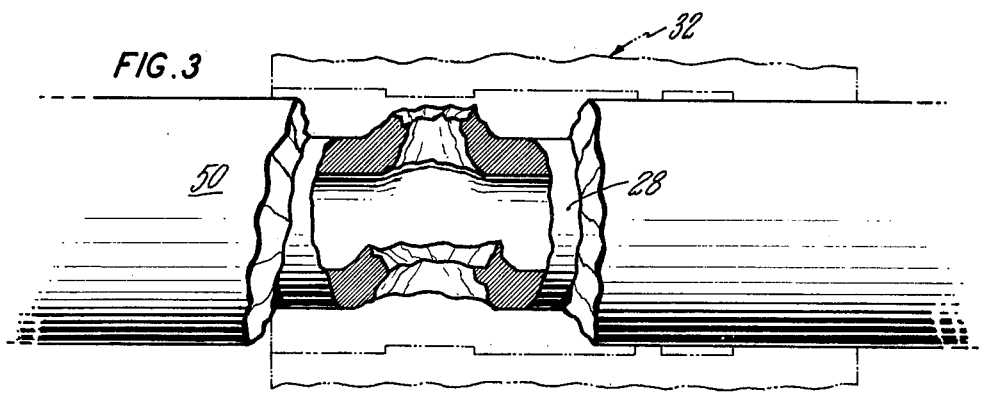
FIG. 3 is a fragmentary showing of a piston rod following ballistic impact.

Referring to FIG. 2, we see the construction of cylinder piston assembly 12 in greater particularity. It will be noted that sleeve member 50 snugly envelops piston rod 28, and is, in turn, snugly enveloped by gland or cylinder end wall 32. During normal operation, as piston 22 reciprocates within cylinder 20, sleeve 50 sealably engages gland ring 32 as piston rod 28 reciprocates therein. The function of sleeve 50 is to prevent jamming of piston rod 28 within gland 32 if the piston rod is deformed for any reason, such as ballistic impact. Sleeve 50 is of selected wall thickness and fabricated of frangible, i.e. brittle, material so as to disintegrate by fragmentation upon ballistic impact so that, as best shown in FIG. 3, with the piston rod 28 so deformed by ballistic impact and the adjacent portion of sleeve 50 disintegrated, the anticipated deformation of piston rod 50 is such that, in deformed orientation, piston rod 28 will not extend outwardly beyond the inner diameter of gland 32. In view of this construction, piston rod 28 can continue to reciprocate within gland 32 and hence the control function of control 10 can continue, despite ballistic hit. If actuating pressure is lost due to the ballistic hit in cylinder piston assembly 12, actuation of the control can continue with cylinder-piston 14 generating the operating force.

In an alternate form, sleeve 50 is made of a soft material so that it will deform with the piston rod 28 upon ballistic impact and it will deform further upon contact with gland 32 during attempted piston reciprocation to permit continued reciprocation of piston rod 28 and hence, piston 22.

As used herein, deformable as relating to sleeve 50 means either frangible so that sleeve 50 fragments or disintegrates upon sharp contact, or soft so that sleeve 50 changes shape in response to sharp contact and further deforms to pass through the interior of gland 32 in response to actuating pressure.

In the frangible sleeve embodiment, sleeve 50 can be made of beryllium copper, carbon or boron. In installations where thermal expansion is not anticipated in piston rod 28 or no subtantial piston rod deformation due to loading takes place, sleeve 50 could be made of a brittle material, such as glass. In the soft sleeve modification, sleeve 50 may be fabricated of carbon, boron or a structural plastic, such as DuPont's Kevlar ® or of a composite material, such as adhesively bonded layers of fiberglass.

Sleeve 50 is loaded in compression only, and all actuating loads go through piston rod 28. Sleeve 50 can accept compression loading since piston rod 28 is providing interior structural support therefor.

In determining the inner diameter of gland 32 and the wall thickness of sleeve 50, the amount of piston rod deformation anticipated, such as petalling, can be determined by test. The amount of piston rod deformation is determined by the type of material of which it is made and the speed and caliber of the projectile of concern.

So that the deformation of cylinder 20 by ballistic impact does not cause piston jamming, piston 22 is preferably made of shearable construction, as in Simmons U.S. Pat. No. 3,884,127.

I wish it to be understood that I do not desire to be limited to the exact details of construction shown and described, for obvious modifications will occur to a person skilled in the art.

I claim:

1. A control including:
   (1) a cylinder-piston assembly comprising:
   a. a cylinder having a bore portion,
   b. a piston positioned in said cylinder bore for reciprocation therewithin and defining a pressure chamber on at least one side thereof within said bore,
   c. a piston rod extending from said piston longitudinally along said bore and terminating at a station external thereof,
   d. a fixed wall member supported from said cylinder and having an aperture enveloping said piston rod and constituting the structural end wall of said pressure chamber,
   e. a nonstructual, frangible sleeve snugly enveloping said piston rod and being snugly enveloped by said wall member aperture and being of selected wall thickness and frangibility so that when said sleeve and piston rod are subjected to sharp impact, the piston rod will deform and the sleeve will disintegrate, at least in the vicinity of the sharp impact and the piston rod deformation, and the piston rod so deformed will be able to pass through the wall member aperture with the sleeve so disintegrated,
   (2) a fluid pressure source connected to said pressure chamber to cause said piston to move within said cylinder during normal operation, and
   (3) a fluid actuator means operatively connected to said cylinder-piston assembly to cause said piston to reciprocate within said cylinder when said piston rod is so deformed and said sleeve so disintegrated due to sharp impact.

2. A control according to claim 1 wherein said actuator means and said cylinder-piston assembly are identical.

3. A control according to claim 1 wherein said sleeve is made of beryllium copper.

4. A control according to claim 1 wherein said sleeve is made of carbon or boron.

5. A control including:
(1) a cylinder-piston assembly comprising:
 a. a cylinder having a bore portion,
 b. a piston positioned in said cylinder bore for reciprocation therewithin and defining a pressure chamber on at least one side thereof within said bore,
 c. a piston rod extending from said piston longitudinally along said bore and terminating at a station external thereof,
 d. a fixed wall member supported from said cylinder and having an aperture enveloping said piston rod and constituting the structural end wall of said pressure chamber,
 e. a nonstructural, deformable sleeve snugly enveloping said piston rod and being snugly enveloped by said wall member aperture and being of selected wall thickness and deformability so that when said sleeve and piston rod are subjected to sharp impact, the sleeve will deform and the piston rod so deformed will be able to pass through the wall member aperture with the sleeve so deformed,
(2) a fluid pressure source connected to said pressure chamber to cause said piston to move within said cylinder during normal operation, and
(3) a fluid actuator means operatively connected to said cylinder-piston assembly to cause said piston to reciprocate within said cylinder with said piston rod and said sleeve so deformed due to sharp impact, and
(4) wherein said sleeve is fabricated of soft material so as to deform upon sharp impact and so as to deform upon contact with said wall member aperture in response to the actuating pressure of said actuator means causing said piston to reciprocate to permit said piston rod and hence said piston to continue to reciprocate.

6. A control according to claim 5 wherein said actuator means and said cylinder-piston assembly are identical.

7. A control according to claim 5 wherein said sleeve is made of H-11 steel.

* * * * *